(12) United States Patent
Natesan (10) Patent No.: US 8,311,833 B2
(45) Date of Patent: *Nov. 13, 2012

(54) INTERACTIVE VOICE RESPONSE SYSTEM

(75) Inventor: Vijay Chandar Natesan, Bangalor (IN)

(73) Assignee: Accenture Global Services Limited, Dublin (IE)

( * ) Notice: Subject to any disclaimer, the term of this patent is extended or adjusted under 35 U.S.C. 154(b) by 245 days.

This patent is subject to a terminal disclaimer.

(21) Appl. No.: 12/796,499

(22) Filed: Jun. 8, 2010

(65) Prior Publication Data

US 2010/0280820 A1 Nov. 4, 2010

Related U.S. Application Data

(63) Continuation of application No. 11/419,606, filed on May 22, 2006, now Pat. No. 7,734,470.

(51) Int. Cl.
*G10L 15/00* (2006.01)
(52) U.S. Cl. ............... 704/270; 704/275; 379/88.22
(58) Field of Classification Search .......... 704/270, 704/275; 379/88.22
See application file for complete search history.

(56) References Cited

U.S. PATENT DOCUMENTS

| | | | |
|---|---|---|---|
| 5,915,001 A | 6/1999 | Uppaluru | |
| 6,697,964 B1 | 2/2004 | Dodrill et al. | |
| 7,269,562 B2 | 9/2007 | Leask et al. | |
| 7,409,344 B2 | 8/2008 | Gurram et al. | |
| 2002/0076008 A1 | 6/2002 | Neary | |
| 2002/0077819 A1* | 6/2002 | Girardo | 704/260 |
| 2003/0083882 A1 | 5/2003 | Schemers, III et al. | |
| 2003/0212561 A1 | 11/2003 | Williams et al. | |
| 2005/0129194 A1 | 6/2005 | Creamer | |
| 2005/0131676 A1 | 6/2005 | Ghasemi et al. | |
| 2005/0131708 A1 | 6/2005 | Palma et al. | |
| 2007/0003037 A1 | 1/2007 | Agapi et al. | |
| 2007/0129947 A1* | 6/2007 | Agapi et al. | 704/257 |
| 2007/0260500 A1* | 11/2007 | Boyette et al. | 705/9 |

OTHER PUBLICATIONS

IBM WebSphere Voice Toolkit, http://www.developer.com/voice/article.php/11062_1567801_2, pp. 1-4, Mar. 14, 2006.

* cited by examiner

*Primary Examiner* — Daniel D Abebe (57) ABSTRACT

Methods and systems for testing and analyzing integrated voice response systems are provided. Computer devices are used to simulate caller responses or inputs to components of the integrated voice response systems. The computer devices receive responses from the components. The responses may be in the form of VXML and grammar files that are used to implement call flow logic. The responses may to analyzed to evaluate the performance of the components and/or call flow logic.

16 Claims, 11 Drawing Sheets

```
<item tag=" vocab=' techhelp';">
   <one-of>
      <item> technical help</item>
      <item>technical support</item>
      <item>technical issue</item>
      <item>technical problem</item>
   </one-of>
</item>
</item tag=" vocab=' billing';">
   <one-of>
      <item> billing help</item>
      <item>my bill</item>
      <item>charges</item>
      <item>my charges</item>
   </one-of>
</item>
```

1. Welcome.vxml:yes->Menu.vxml:pc_issue->SystemOrAgent.vxml:yes->Transfer.vxml<end>
2. Welcome.vxml:yes->Menu.vxml:pc_issue->SystemOrAgent.vxml:no->TechIssue.vxml:yes->ByeBye.vxml<end>
3. Welcome.vxml:yes->Menu.vxml:pc_issue->SystemOrAgent.vxml:no->TechIssue.vxml:no->Transfer.vxml<end>
4. Welcome.vxml:yes->Menu.vxml:pc_issue->SystemOrAgent.vxml:no->TechIssue.vxml:main_menu>Menu.vxml<end>
5. Welcome.vxml:yes->Menu.vxml:account_issue->SystemOrAgent.vxml:yes->Transfer.vxml<end>
6. Welcome.vxml:yes->Menu.vxml:account_issue->SystemOrAgent.vxml:no->AccountStatus.vxml:yes->ByeBye.vxml<end>
7. Welcome.vxml:yes->Menu.vxml:account_issue->SystemOrAgent.vxml:no->AccountStatus.vxml:no->Transfer.vxml<end>
8. Welcome.vxml:yes->Menu.vxml:account_issue->SystemOrAgent.vxml:no->AccountStatus.vxml:main_menu->Menu.vxml<end>
   Welcome.vxml:no->ByeBye.vxml<end>

INTERACTIVE VOICE RESPONSE SYSTEM

This application is a Continuation Application of the commonly-owned U.S. patent application with Ser. No. 11/419,606, filed May 22, 2006, by V. Natesan, and entitled "Interactive Voice Response System," now U.S. Pat. No. 7,734,470, hereby incorporated by reference in its entirety.

FIELD OF THE INVENTION

This invention relates generally to interactive voice response systems. More particularly, aspects of the invention provide methods and systems for testing interactive voice response systems.

DESCRIPTION OF RELATED ART

Interactive voice response systems are used to allow telephone callers to interact with computer systems. Users typically respond to prompts with voice or telephone keypad inputs. Voice extensible markup language (VXML) files are commonly used to define call flow logic. VXML is designed for creating audio dialogs that feature synthesized speech, digitized audio, recognition of spoken and DTMF key input, recording of spoken input, telephony, and mixed initiative conversations. For example, call flow logic implemented with a VXML file may select a prompt to present to a caller based on a voice response left by the caller. Grammar files include vocabulary that callers may use when responding to prompts. For example, when a caller is prompted to indicate how the caller will identifying herself, a grammar file may determine that the acceptable responses are user, user name, user identification and member. The call flow logic identified in the VXML file will determine the next action as a function of the response provided by the caller.

Conventional systems for testing call flow logic and grammar files typically require testers to interact with interactive voice response systems in the same manner that callers interact with such systems. Testers must place phone calls and interact with servers. The phone calls may be long distance or international calls and can have a significant impact on the cost of testing. Such testing methods can also be time consuming and labor intensive.

Therefore, there is a need in the art for more efficient interactive voice response testing systems and methods that do not require the use of telephone calls to test call flow logic and grammar files.

BRIEF SUMMARY OF THE INVENTION

Aspects of the invention overcome problems and limitations of the prior art by providing systems and methods that allow for testing and analyzing call flow logic and grammar files by interacting with servers that host the call flow logic and grammar files via the Internet, or other wide area network (WAN). A testing application may create hypertext transfer protocol (HTTP) requests that simulate inputs to the grammar server and the VXML application server. The responses received from the VXML and grammar servers may be analyzed to test, reverse engineer or otherwise analyze the call flow logic implemented with VXML files and grammar files.

Some embodiments of the invention may include or utilize computer-executable instructions for performing one or more of the disclosed methods. The computer-executable instructions may be stored on a computer-readable medium, such as a portable memory drive or optical disk.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
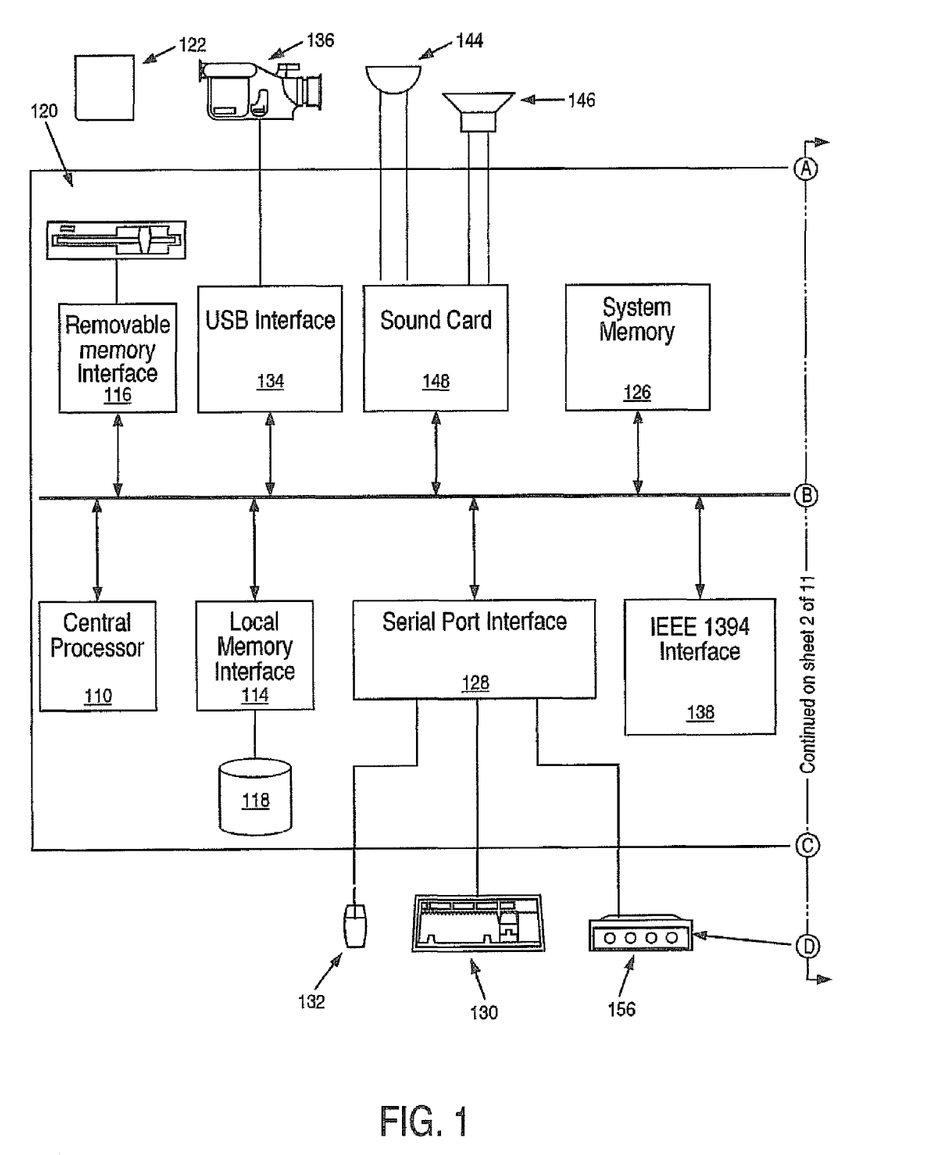
FIG. 1 shows a typical prior art workstation and communication connections.

Various embodiments of the present invention may be implemented with computer devices and systems that exchange and process data. Elements of an exemplary computer system are illustrated in FIG. 1, in which the computer 100 is connected to a local area network (LAN) 102 and a wide area network (WAN) 104. Computer 100 includes a central processor 110 that controls the overall operation of the computer and a system bus 112 that connects central processor 110 to the components described below. System bus 112 may be implemented with any one of a variety of conventional bus architectures.

Computer 100 can include a variety of interface units and drives for reading and writing data or files. In particular, computer 100 includes a local memory interface 114 and a removable memory interface 116 respectively coupling a hard disk drive 118 and a removable memory drive 120 to system bus 112. Examples of removable memory drives include magnetic disk drives and optical disk drives. Hard disks generally include one or more read/write heads that convert bits to magnetic pulses when writing to a computer-readable medium and magnetic pulses to bits when reading data from the computer readable medium. A single hard disk drive 118 and a single removable memory drive 120 are shown for illustration purposes only and with the understanding that computer 100 may include several of such drives. Furthermore, computer 100 may include drives for interfacing with other types of computer readable media such as magneto-optical drives.

Unlike hard disks, system memories, such as system memory 126, generally read and write data electronically and do not include read/write heads. System memory 126 may be implemented with a conventional system memory having a read only memory section that stores a basic input/output system (BIOS) and a random access memory (RAM) that stores other data and files.

A user can interact with computer 100 with a variety of input devices. FIG. 1 shows a serial port interface 128 coupling a keyboard 130 and a pointing device 132 to system bus 112. Pointing device 132 may be implemented with a hardwired or wireless mouse, track ball, pen device, or similar device.

Computer 100 may include additional interfaces for connecting peripheral devices to system bus 112. FIG. 1 shows a universal serial bus (USB) interface 134 coupling a video or digital camera 136 to system bus 112. An IEEE 1394 interface 138 may be used to couple additional devices to computer 100. Furthermore, interface 138 may be configured to operate with particular manufacture interfaces such as FireWire developed by Apple Computer and i.Link developed by Sony. Peripheral devices may include touch sensitive screens, game pads scanners, printers, and other input and output devices and may be coupled to system bus 112 through parallel ports, game ports, PCI boards or any other interface used to couple peripheral devices to a computer.

Computer 100 also includes a video adapter 140 coupling a display device 142 to system bus 112. Display device 142 may include a cathode ray tube (CRT), liquid crystal display (LCD), field emission display (FED), plasma display or any other device that produces an image that is viewable by the user. Sound can be recorded and reproduced with a microphone 144 and a speaker 146. A sound card 148 may be used to couple microphone 144 and speaker 146 to system bus 112.

One skilled in the art will appreciate that the device connections shown in FIG. 1 are for illustration purposes only and that several of the peripheral devices could be coupled to system bus 112 via alternative interfaces. For example, video camera 136 could be connected to IEEE 1394 interface 138 and pointing device 132 could be connected to USB interface 134.

Computer 100 includes a network interface 150 that couples system bus 112 to LAN 102. LAN 102 may have one or more of the well-known LAN topologies and may use a variety of different protocols, such as Ethernet. Computer 100 may communicate with other computers and devices connected to LAN 102, such as computer 152 and printer 154. Computers and other devices may be connected to LAN 102 via twisted pair wires, coaxial cable, fiber optics or other media. Alternatively, radio waves may be used to connect one or more computers or devices to LAN 102.

A wide area network 104, such as the Internet, can also be accessed by computer 100. FIG. 1 shows a modem unit 156 connected to serial port interface 128 and to WAN 104. Modem unit 156 may be located within or external to computer 100 and may be any type of conventional modem, such as a cable modem or a satellite modem. LAN 102 may also be used to connect to WAN 104. FIG. 1 shows a router 158 that may connect LAN 102 to WAN 104 in a conventional manner. A server 160 is shown connected to WAN 104. Of course, numerous additional servers, computers, handheld devices, personal digital assistants, telephones and other devices may also be connected to WAN 104.

The operation of computer 100 and server 160 can be controlled by computer-executable instructions stored on a computer-readable medium 122. For example, computer 100 may include computer-executable instructions for transmitting information to server 160, receiving information from server 160 and displaying the received information on display device 142. Furthermore, server 160 may include computer-executable instructions for transmitting hypertext markup language (HTML), extensible markup language (XML) or voice extensible markup language (VXML) computer code to computer 100.

As noted above, the term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" 102, 104, but also a "content network," which is comprised of the data—attributable to a single entity—which resides across all physical networks.

Figure 2:
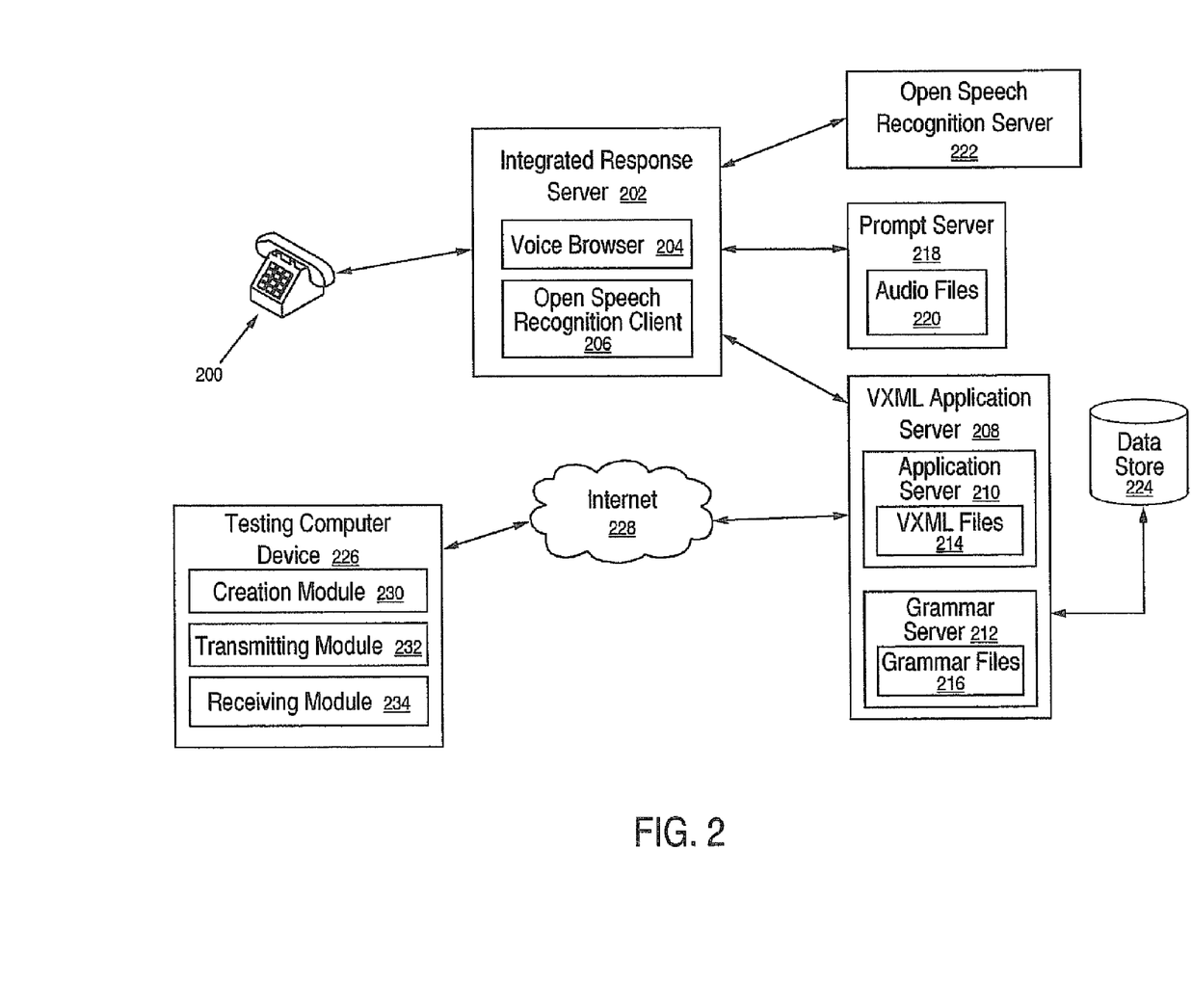
FIG. 2 illustrates an integrated voice response system and testing architecture, in accordance with an embodiment of the invention.

FIG. 2 illustrates an integrated voice response system and testing architecture, in accordance with an embodiment of the invention. A caller may utilize a telephone 200 to interact with an integrated response server 202. Response server 202 may include a voice browser 204 and an open speech recognition client 206. Upon receiving a call, voice browser 204 may request VXML pages or files from a VXML application server 208. VXML application server 208 may include an application server 210 and a grammar server 212. Application server 210 may link to or include VXML files 214. Grammar server 212 may include or be linked to grammar files 216. The VXML files retrieved by voice browser 204 implement call flow logic and identify the actions to be taking by integrated response server 202. For example, a retrieved VXML file may indicate that voice browser 204 should retrieve an audio file that will be played to a caller. A prompt server 218 may include audio files 220 that will be played to callers. The VXML files determine which audio files will be played and at what times.

After playing an audio file, a caller may respond to integrated response server 202 with telephone 200. For example, an audio file may be played that asks a user to select from four menu options. The caller may respond with a voice message that indicates menu option selected or may use a touch tone telephone keypad too generate a dual tone multi-frequency (DTMF) signal indicating the menu option. After receiving a response from a caller, open speech recognition client 206 may then request one or more grammar files from grammar server 212 to validate user response.

Figure 3:
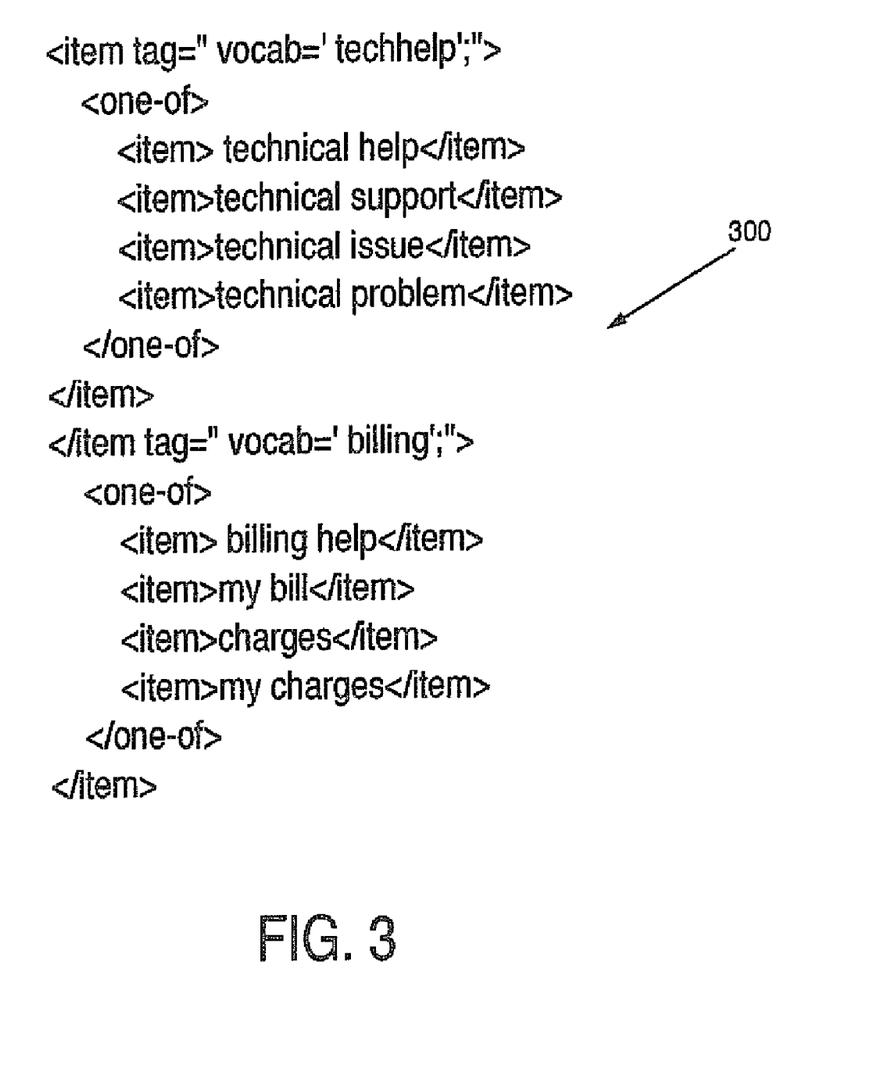
FIG. 3 illustrates an excerpt of a conventional grammar file that may be used with aspects of the invention.

FIG. 3 illustrates an excerpt of a conventional grammar file 300 that may be used with aspects of the invention. Grammar file 300 indicates that in response to a prompt from an integrated response server, a caller may respond with one of four vocabulary values. The values are "technical help," "technical support," "technical issue," and "technical problem." After retrieving a grammar file, open speech recognition client 206 converts a caller's response to text and passes the response and the retrieved grammar file to an open speech recognition server 222. Open speech recognition server 222 may then validate user responses and return text identified in the grammar file. If the caller does not respond with one of the vocabulary values listed in the grammar file, an error condition may exist and integrated voice response server 202 may replay an audio prompt to the caller.

Upon receiving text returned from open speech recognition server 222, voice browser 204 may than retrieve another VXML file or page from application server 210. The retrieved VXML file or page will be a function of the caller's response. For example, if the caller's response to a prompt is "technical help," a first VXML file will be returned to voice browser 204. If the caller's response to the prompt is "billing" a second VXML file will be returned to voice browser 204. A data store 224 may be coupled to VXML application server 208 to store information such as user names, user identification numbers and messages.

A testing computer device 226 may be used to communicate with VXML application server 208 via a wide-area network, such as the Internet 228. Testing computer device 226 may utilize a testing application to receive and transmit files formatted in accordance with the hypertext transport protocol (http). Testing computer device 226 may include a creation module 230 for creating requests that simulate inputs to VXML application server 208, a transmitting module 232 for transmitting requests to VXML application server 208 and a receiving module 234 for receiving responses from VXML application server 208. The use of testing computer device 226 allows testing to be accomplished without the use of a telephone or telephone calls.

Figure 4:
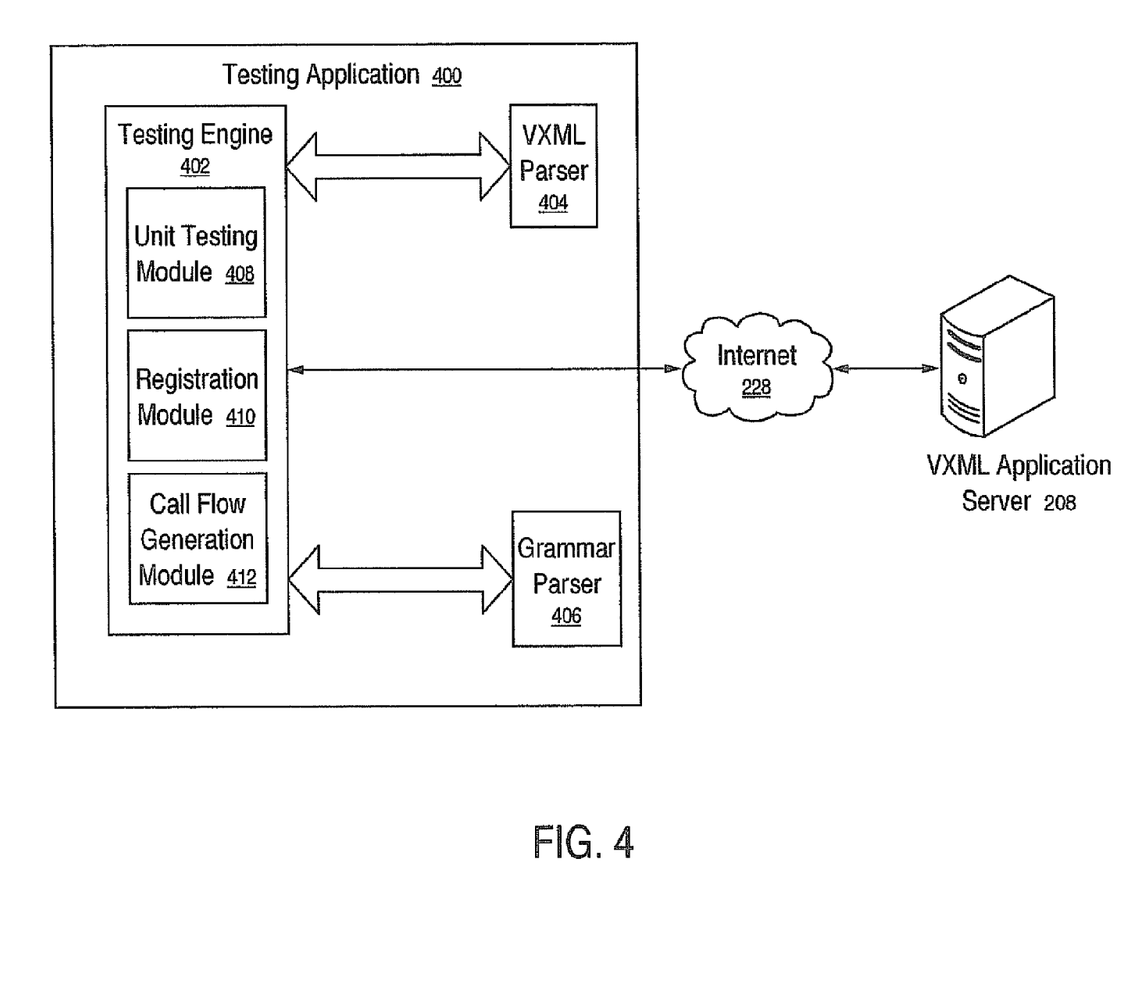
FIG. 4 illustrates a testing application architecture for testing VXML and grammar files, in accordance with an embodiment of the invention.

FIG. 4 illustrates a testing application architecture for testing VXML and grammar files, in accordance with an embodiment of the invention. Testing application 400 may include a testing engine 402, a VXML parser 404 and a grammar parser 406. VXML parser 404 is configured to parse VXML files and grammar parser 406 is configured to parse grammar files. Testing engine 402 may include a unit testing module 408, a regression module 410 and a call flow generation module 412.

Figure 5:
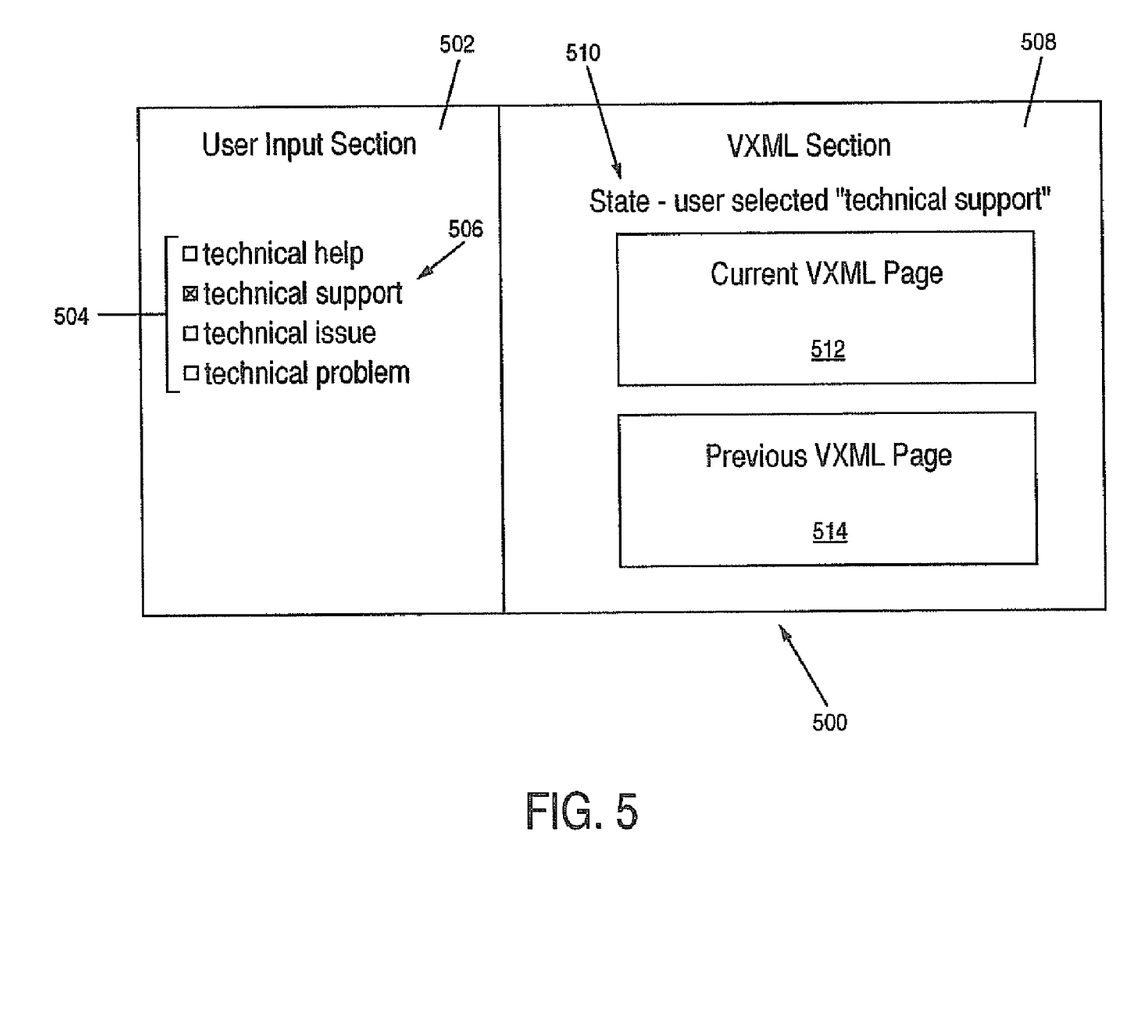
FIG. 5 illustrates a graphical user interface that may be generated by a unit testing module, in accordance with an embodiment of the invention.

Unit testing module 408 may be used to provide inputs and input data that simulates inputs to a VXML application server and/or a grammar server. Unit testing module 408 may also be programmed to analyze the results of files retrieved from the VXML application server. FIG. 5 illustrates a graphical user interface 500 that may be generated by unit testing module 408. An input section 502 may include menu options for selecting input values. The input values may be derived from grammar files that were configured in the respective VXML file that is being tested. In the example shown, a grammar file is parsed to create input values 504 and the user has selected technical support 506. In other embodiments user input section 502 may include a text box that allows a user to input text. Text may include a credit card number, phone number or other information for which it is not practical to represent all of the possible values with a list. In operation, unit testing module 408 applies "technical support" to the next HTTP request, so that the next VXML file would be returned by Application server 208 based on the call flow logic that was built, and the call flow proceeds. VXML output section 508 may display the state of testing in section 510, a current VXML page in section 512 and a previous VXML page in section 514. Of course, other data such as variable values, and call flow logic may be tracked and displayed.

Regression module 410 may be used to repeatedly test the call flow logic implemented with VXML and grammar files. In one embodiment of the invention, regression module 410 includes or is linked to a data file that includes numerous input values that a caller or integrated response server would typically provide to a VXML application server. The multiple inputs are then sent to the VXML application server by regression module 410 and the returned grammar files and VXML files are analyzed to determine whether or not the application is operating appropriately.

Figure 6:
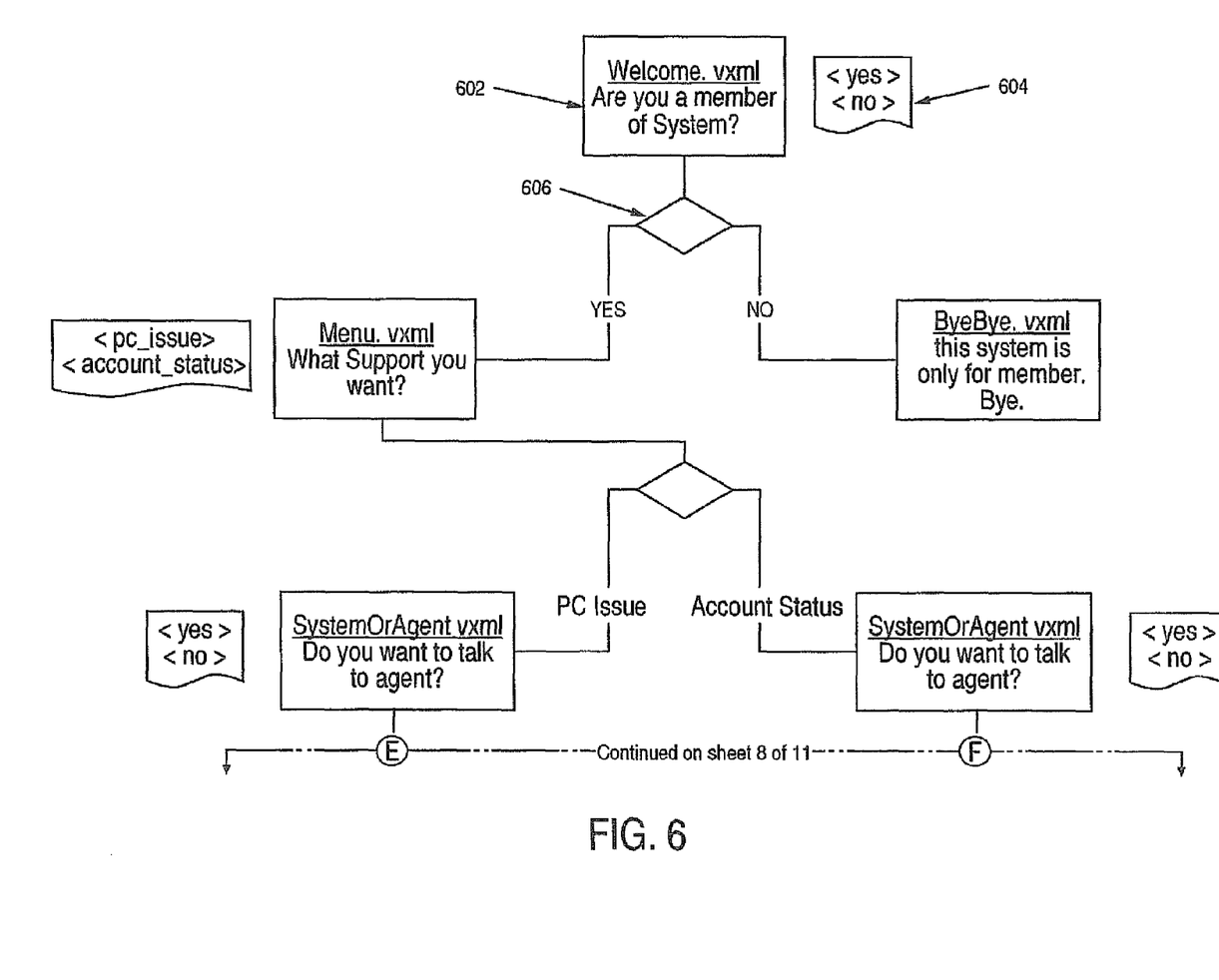
FIG. 6 illustrates a typical call flow logic diagram.

A call flow generation module 412 may be used to generate call flow logic resulting from multiple inputs delivered to VXML application server 208. FIG. 6 illustrates a typical call flow logic diagram. VXML files are represented with the shape shown for a "welcome" VXML file 602. Grammar files are represented with the shape shown for a yes or no grammar file 604. And, user input sections are represented by the shape shown for element 606. User input sections may correspond to recognition modules.

Figure 7:
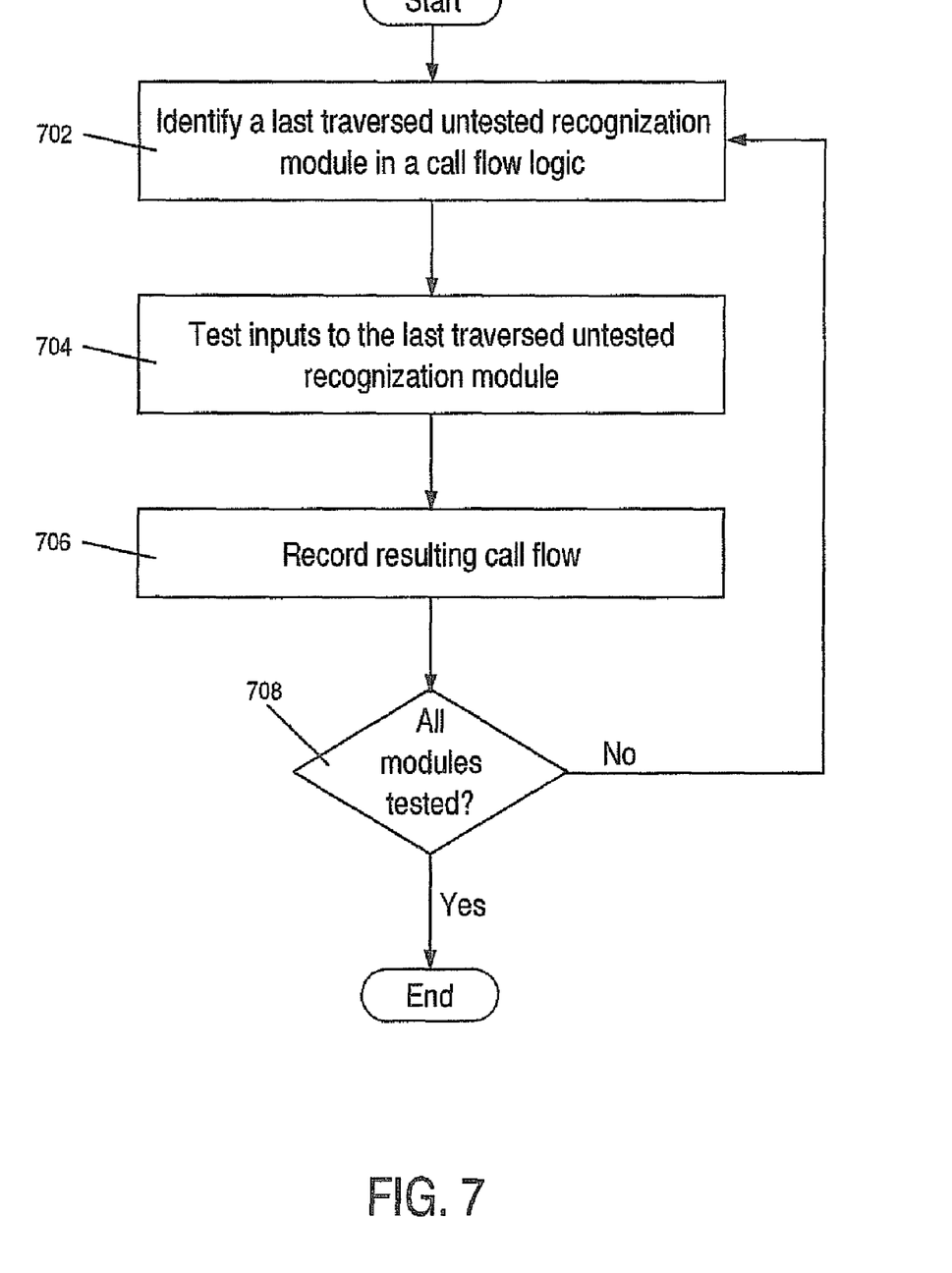
FIG. 7 illustrates a method that may be used to generate or reverse engineer call flow logic, in accordance with an embodiment of the convention

FIG. 7 illustrates a method that may be used to generate or reverse engineer call flow logic, in accordance with an embodiment of the convention. The method shown in FIG. 7 may be implemented with computer-executable instructions or control logic within call flow generation module 412. First, in step 702 a last traversed untested recognition module in a call flow logic is identified. For example, FIG. 5 shows that recognition module 608 is a last traversed untested recognition module. That is, no further recognition modules follow recognition module 608. By starting with the last traversed recognition module and providing test inputs to all of the recognition modules included within a call flow, the actual call flow logic may be recorded or reverse engineered without missing any elements. Next, in step 704 input values are provided to the last traversed untested recognization module to test the resulting call flow.

In step 706 the call flow resulting from the test input values is recorded. Next, it is determined whether or not all of the recognition modules have been tested in step 708. When all of the modules have not been tested, control returns to step 702 where a last traversed untested recognition module is identified. When all of the modules have been tested, the process ends.

Figure 8:
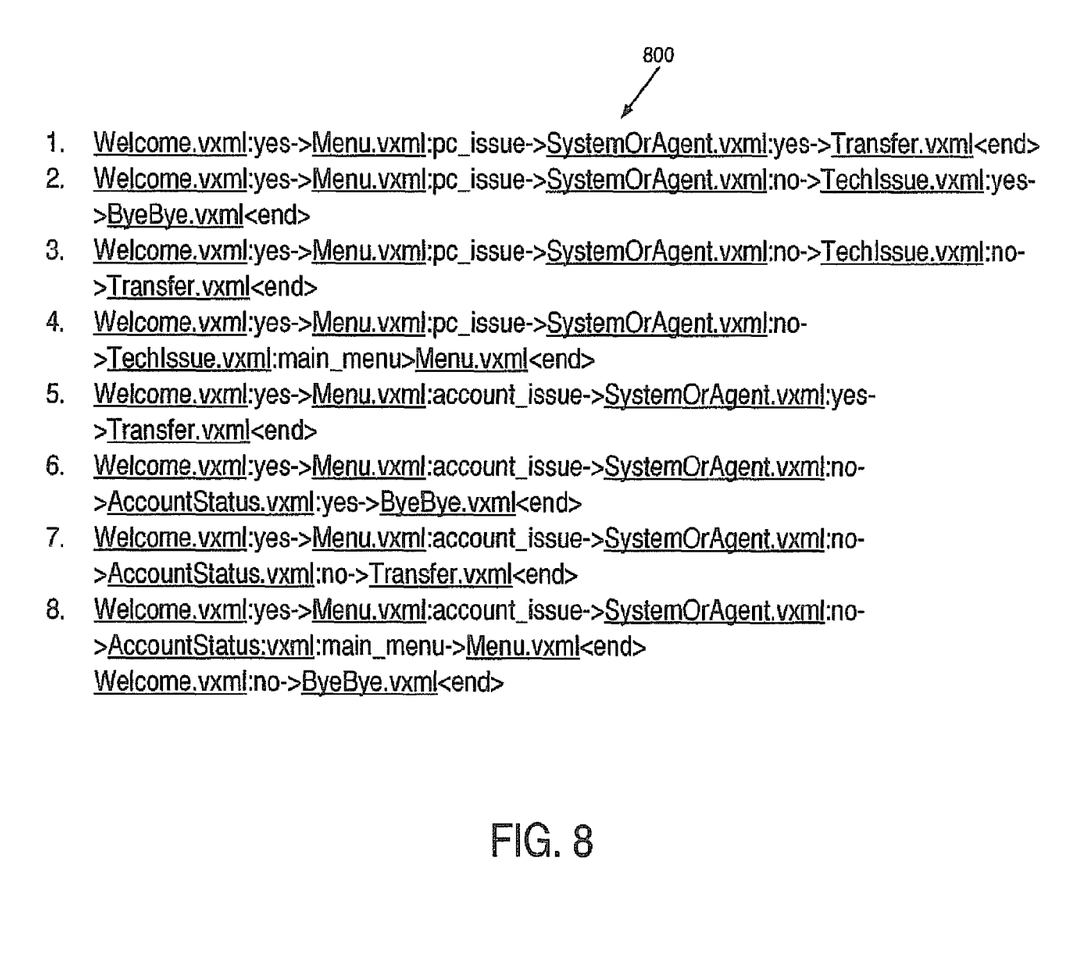
FIG. 8 shows a listing of call flow that may be generated with the process shown in FIG. 7.

FIG. 8 shows a listing 800 of call flow logic that may be generated with the process shown in FIG. 7. One skilled in the art will appreciate that numerous alternative methods may be used to provide inputs to and analyze responses from an integrated voice response system. From the listing shown in FIG. 8, a diagram such as the one shown in FIG. 5 may be generated.

Figure 9:
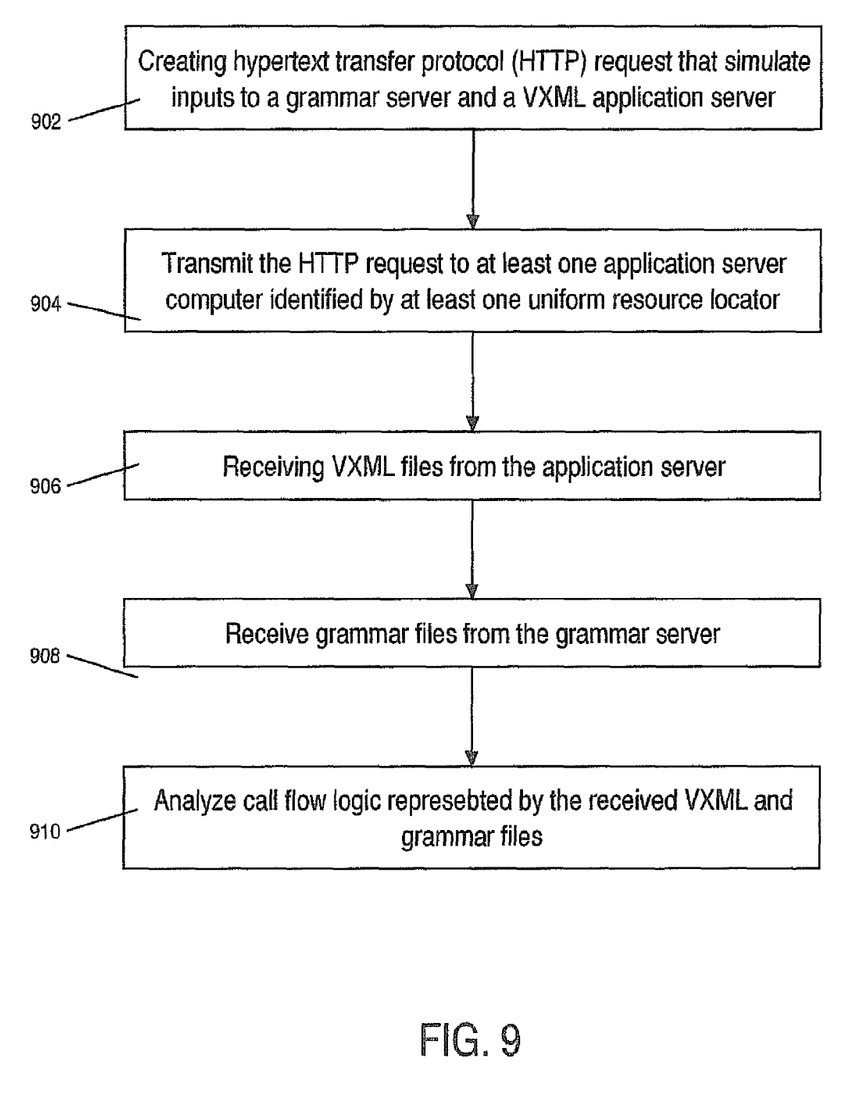
FIG. 9 illustrates a method of testing VXML and grammar files used with an integrated voice response system, in accordance with an embodiment of the convention.

FIG. 9 illustrates a method of testing VXML and grammar files used with an integrated voice response system, in accordance with an embodiment of the convention. In step 902 hypertext transfer protocol (HTTP) requests are created to simulate inputs to a grammar server and a VXML application server. Next, in step 904 the HTTP requests are transmitted to at least one application server computer identified by a uniform resource locator (URL). In alternative embodiments of the invention other protocols and formats of requests may be used to simulate inputs to a grammar server and a VXML application server. The protocols and/or formats of the requests used to test the grammar server and the VXML application server maybe the same protocols and/formats used by other components that interact with such servers during normal operation. The uniform resource locator may be in the form of a domain name or Internet address.

Next, in step 906 the VXML files are received from the application server. The received VXML files may be a function of the input values provided to the VXML application server. Grammar files may be received from a grammar server in step 908. In one embodiment of the invention, the application server and grammar server are implemented with the same physical computer device. Finally, in step 910 call flow logic represented by the received VXML and grammar files is analyzed. Step 910 may include comparing the call flow logic with expected call flow logic, reverse engineering the call flow logic or performing other types of analysis.

The modules disclosed herein may be implemented by way of dedicated firmware or hardware. By way of example, some of the modules could be highly specialized micro-processors or application specific integrated circuits. Any implementation on a work station provided in specification is only by way of exemplification and for prototype implementation. Some or all the modules could be implemented by a state machine that has no stored program instructions or in one or more application specific integrated circuits (ASICs), in which each module or some combinations of certain of the modules are implemented as custom logic. Of course, a combination of the two approaches could be used. Thus, modules for these functions have been described herein. Further, it is expected that, notwithstanding possibly significant effort and many design choices motivated by, for example, available time, current technology, and economic considerations, when guided by the concepts and principles disclosed herein a skilled person will be capable of generating such software instructions and programs and ICs with minimal experimentation.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. All are considered within the sphere, spirit, and scope of the invention. For example, aspects of the invention may be used to test hardware equipment, logic and files other than VXML and grammar files.

I claim:

1. An integrated voice response testing system comprising:
a call flow generation module programmed with computer-executable instructions to reverse engineer an integrated voice response application by:
executing the integrated voice response application;
selecting inputs available in at least one grammar file;
recording a call flow that results from the selected inputs;
testing inputs to the last traversed untested recognition module in the call flow where no further recognition modules follow the last traversed untested recognition module in the call flow;
recording a call flow that results from testing the inputs to the last traversed untested recognition module; and
testing inputs to the second to last traversed untested recognition module.

2. The integrated voice response testing system of claim 1, further including:
a grammar parser that interprets vocabulary included in the at least one grammar file.

3. The integrated voice response testing system of claim 1, further including:
a testing engine programmed with computer executable instructions to perform the steps comprising:
(a) creating a hypertext transfer protocol (HTTP) request that simulates inputs to a grammar server and a VXML application server;
(b) transmitting the HTTP request to at least one application server computer identified by at least one uniform resource locator; and
(c) receiving VXML files from a VXML server; and
a VXML parser module that interprets the VXML files received from the VXML server.

4. The integrated voice response testing system of claim 3, further including:
a regression module that provides test inputs to recognition modules included within the VXML files.

5. The integrated voice response testing system of claim 4, wherein the regression module is configured to analyze responses to the test inputs to the recognition modules.

6. The integrated voice response testing system of claim 4, further including a property file linked to the reorganization modules and that contains the test inputs.

7. The integrated voice response testing system of claim 6, wherein the property file contains multiple test inputs for each of the recognition modules.

8. The integrated voice response testing system of claim 3, wherein (b) comprises:
transmitting the HTTP request to the at least one application server via the Internet.

9. A method for testing VXML and grammar files used in an integrated voice response system, the method comprising:
(a) creating a hypertext transfer protocol (HTTP) request that simulates inputs to a grammar server and a VXML application server;
(b) transmitting the HTTP request to at least one application server computer identified by at least one uniform resource locator;
(c) receiving VXML files from the VXML application server;
(d) receiving grammar files from the grammar server; and
(e) analyzing call flow logic represented by the received VXML and grammar files, the analyzing comprising:
recording a call flow that results from inputs selected from the grammar files, the call flow comprising a series of recognition modules;
testing inputs to the last traversed untested recognition module in the call flow where no further recognition modules follow the last traversed untested recognition module in the call flow;
recording a call flow that results from testing the inputs to the last traversed untested recognition module; and
testing inputs to the second to last traversed untested recognition module.

10. The method of claim 9, wherein (a) comprises creating a property file that contains the test inputs.

11. The method of claim 9, wherein (a) comprises selecting menu items representing test input values for at least one recognition module from a graphical user interface.

12. The method of claim 9, wherein (b) comprises transmitting the hypertext transfer protocol (HTTP) request to the grammar server and the VXML application server via the Internet.

13. The method of claim 9, wherein the at least one application server computer comprises the grammar server and the VXML application server.

14. A computer-readable medium containing computer-executable instructions for causing a computer device to perform steps comprising:
(a) creating a first computer-readable file that simulates inputs to call flow logic file hosted on an application server identified by a uniform resource locator;
(b) formatting the first computer-readable file for transport across a wide area network;
(c) transmitting the first computer-readable file to the application server via the wide area network;
(d) receiving grammar files from the application server;
(e) in response to (c), receiving a second computer-readable file that implements call flow logic;
(f) analyzing the call flow logic represented by the second file and the grammar files, the analyzing comprising:
recording a call flow that results from inputs selected from the grammar files, the call flow comprising a series of recognition modules;
testing inputs to the last traversed untested recognition module in the call flow where no further recognition modules follow the last traversed untested recognition module in the call flow;
recording a call flow that results from testing the inputs to the last traversed untested recognition module; and
testing inputs to the second to last traversed untested recognition module.

15. The computer-readable medium of claim 14, wherein the wide area network comprises the Internet.

16. The computer-readable medium of claim 14, wherein the second file comprises a VXML file.

* * * * *